United States Patent
Si et al.

(10) Patent No.: US 11,824,861 B2
(45) Date of Patent: Nov. 21, 2023

(54) APPLICATION ACCESSING METHOD, APPLICATION ACCESSING APPARATUS AND STORAGE MEDIUM

(71) Applicant: BEIJING XIAOMI MOBILE SOFTWARE CO., LTD., Beijing (CN)

(72) Inventors: Mengyu Si, Beijing (CN); Jingcheng Zhang, Beijing (CN); Dong Li, Beijing (CN); Weidong Zhang, Beijing (CN); Le Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 171 days.

(21) Appl. No.: 17/187,312

(22) Filed: Feb. 26, 2021

(65) Prior Publication Data

US 2021/0392140 A1    Dec. 16, 2021

(30) Foreign Application Priority Data

Jun. 12, 2020 (CN) .......................... 202010536898.X

(51) Int. Cl.
*H04L 29/06* (2006.01)
*H04L 9/40* (2022.01)

(52) U.S. Cl.
CPC .......... *H04L 63/101* (2013.01); *H04L 63/168* (2013.01); *H04L 63/20* (2013.01)

(58) Field of Classification Search
CPC ....... H04L 63/101; H04L 63/68; H04L 63/20; H04L 63/105; H04L 63/08; G06F 21/6245

USPC ............................................................ 726/4
See application file for complete search history.

(56) References Cited

U.S. PATENT DOCUMENTS

2015/0356283 A1*  12/2015  Kress ............... G06F 21/53
                                                  726/17
2017/0076099 A1    3/2017   Yao et al.
2019/0362095 A1*  11/2019  Tripp .............. G06F 21/6245

FOREIGN PATENT DOCUMENTS

EP        3089068 A1     11/2016

OTHER PUBLICATIONS

Extended European Search Report in Application No. 21161912.7, dated Aug. 20, 2021.

* cited by examiner

*Primary Examiner* — Longbit Chai
(74) *Attorney, Agent, or Firm* — SYNCODA LLC; Feng Ma

(57) ABSTRACT

An application accessing method can be applied to a terminal, and include: monitoring whether an application invokes privacy content; and authorizing the application with permission to access the privacy content, in response to monitoring that the application invokes the privacy content, and returning other information different from the privacy content. Therefore, the user can realize the purpose of protecting the security of the user's privacy information under the premise of normal use of the application.

15 Claims, 3 Drawing Sheets

APPLICATION ACCESSING METHOD, APPLICATION ACCESSING APPARATUS AND STORAGE MEDIUM

CROSS-REFERENCE TO RELATED APPLICATIONS

This application claims priority to Chinese Patent Application No. 202010536898.X filed on Jun. 12, 2020, the disclosure of which is hereby incorporated by reference in its entirety.

BACKGROUND

With the rapid development of the mobile internet technologies, portable terminals such as smart phones and tablet computers have become an indispensable part of users' life and work. Correspondingly, applications installed on the terminal are becoming more and more abundant.

SUMMARY

The present disclosure relates generally to the field of terminal technologies, and more specifically, to an application accessing method, an application accessing apparatus and a storage medium.

According to aspects of the embodiments of the present disclosure, there is provided an application accessing method applied to a terminal, the application accessing method includes: monitoring whether an application invokes privacy content; and authorizing the application with permission to access the privacy content in response to monitoring that the application invokes the privacy content, and returning other information different from the privacy content.

In some embodiments, the other information is empty information.

In some embodiments, before authorizing the application with permission to access the privacy content and returning other information different from the privacy content, the method further includes: determining that the application has enabled a predetermined permission flag, wherein the application that enables the permission flag has the permission to invoke the privacy content but is restricted from invoking the privacy content.

In some embodiments, the determining that the application has enabled the permission flag includes: determining that the application has enabled the permission flag, in response to receiving a user's instruction to turn on a switch in a terminal setting item, the switch being used to indicate whether the permission flag of the application is enabled or not.

In some embodiments, the authorizing the application with the permission to access the privacy content, in response to monitoring that the application invokes the privacy content, and returning other information different from the privacy content includes: intercepting a request that the application invokes the privacy content, in response to monitoring that the application invokes the privacy content, and determining that the application has enabled the permission flag through a permission management service; and authorizing the application with the permission to access the privacy content by the permission management service, and returning other information different from the privacy content.

According to a second aspect of the embodiments of the present disclosure, there is provided an application accessing apparatus including a monitoring portion configured to monitor whether an application invokes privacy content; and a processing portion configured to authorize the application with permission to access the privacy content, in response to monitoring that the application invokes the privacy content, and return other information different from the privacy content.

In some embodiments, the other information is empty information.

In some embodiments, the application accessing apparatus further includes: a determining portion configured to determine that the application has enabled a predetermined permission flag before authorizing the application with the permission to access the privacy content and returning other information different from the privacy content, wherein the application that enables the permission flag has the permission to invoke the privacy content but is restricted from invoking the privacy content.

In some embodiments, the determining portion determines that the application has enabled the permission flag in the following manner: determining that the application has enabled the permission flag, in response to receiving a user's instruction to turn on a switch in a terminal setting item, the switch being used to indicate whether the permission flag of the application is enabled or not.

In some embodiments, the processing portion authorizes the application with the permission to access the privacy content, in response to monitoring that the application invokes the privacy content, and returns other information different from the privacy content in the following manner: intercepting a request that the application invokes the privacy content, in response to monitoring that the application invokes the privacy content, and determining that the application has enabled the permission flag through a permission management service; and authorizing the application with the permission to access the privacy content by the permission management service, and returning other information different from the privacy content.

According to a third aspect of the embodiments of the present disclosure, there is provided an application accessing apparatus including a processor; and memory for storing instructions executable by the processor, wherein, the processor is configured to: execute the application accessing method of the foregoing first aspect or any example of the first aspect.

According to a fourth aspect of the present disclosure, there is provided a non-transitory computer-readable storage medium, on which computer-executable instructions are stored, and when the computer-executable instructions are executed by a processor, the application accessing method of the foregoing first aspect or any an example of the first aspect is executed.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Figure 1:
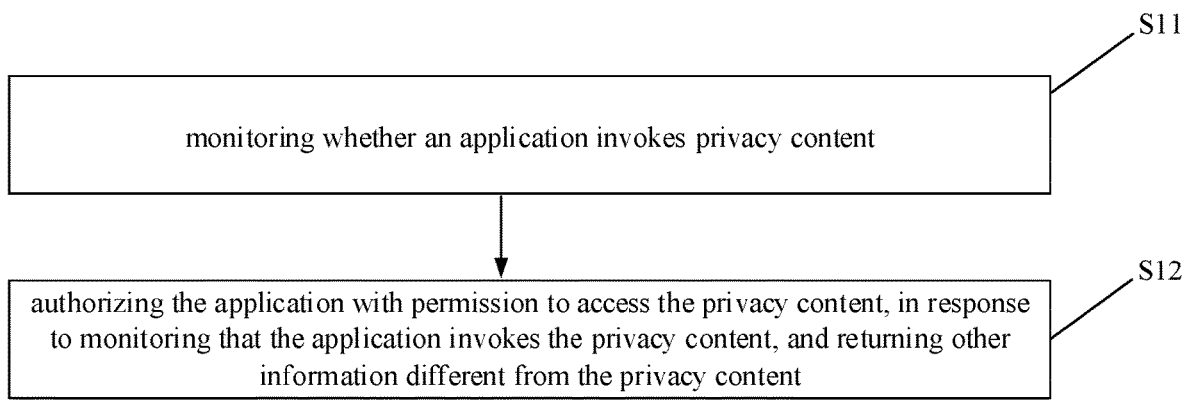
FIG. 1 is a flowchart illustrating an application accessing method according to some embodiments.

Description will now be made in detail to some embodiments, examples of which are illustrated in the accompanying drawings. The following description refers to the accompanying drawings in which the same numbers in different drawings represent the same or similar elements unless otherwise indicated. The implementations set forth in the following some embodiments do not represent all implementations consistent with the present disclosure. Instead, they are merely examples of devices and methods consistent with aspects related to the present disclosure as recited in the appended claims.

When the applications installed on the terminal are running, it is often necessary to obtain various permissions of the terminal to realize the functions of the application.

However, when an application is installed on a terminal, it often occurs that the application must be given the required permissions before it can be used. In order to use the application, the user may have to authorize the application the required permission, but the security of the information stored in the terminal will not be guaranteed.

Various embodiments of the present disclosure can be applied to an application scenario where an application installed in a terminal invokes information in the terminal. In the some embodiments described below, the terminal is also referred to as a smart terminal device sometimes, wherein the terminal may be a mobile terminal, or may also be referred to as a user equipment (UE), a mobile station (MS), and the like. The terminal is a device that provides voice and/or data connections to the user, or is a chip disposed in the device, such as a handheld device with a wireless connection function, a vehicle device, and the like. For example, examples of terminals may include: mobile phones, tablet computers, notebook computers, handheld computers, mobile Internet devices (MID), wearable devices, virtual reality (VR) devices, augmented reality (AR) devices, wireless terminals in industrial control, wireless terminals in unmanned driving, wireless terminals in remote surgery, wireless terminals in smart grids, wireless terminals in transportation safety, wireless terminals in smart cities, wireless terminals in smart homes, and the like.

At present, most applications, when being installed, must be given required permission before they can be used. However, after the application obtains the required permission, there is a risk that the application utilizes the obtained permission to obtain the user's privacy content in the terminal at any time.

In related technologies, in the process of using the application function triggered by the user, if the application needs to invoke the privacy content in the terminal, the application will remind the user in the form of a pop-up window before invoking the privacy content in the terminal, and the application can invoke the privacy content in the terminal after the user's secondary confirmation.

However, more often, without the knowledge of the user, there is a problem that the application utilizes the obtained permission to freely obtain the user's privacy content in the terminal, which causes the leakage of the user's private information.

Therefore, in order to prevent the application from utilizing the obtained permission to leak the user's private information on the terminal, and causing hidden dangers to the security of the terminal information, the present disclosure can provide an application accessing method to ensure that the application installed in the terminal can realize the purpose of protecting the user's privacy content in the terminal under normal use.

FIG. 1 is a flowchart illustrating an application accessing method according to some embodiments, and as shown in FIG. 1, the application accessing method is applied in a terminal, and includes the following steps.

In step S11, it is monitored whether an application invokes privacy content.

The privacy content involved in the present disclosure can be content that requires high privacy and needs to be protected in the terminal, for example, the privacy content can include terminal unique identification code information and/or predetermined information of other applications. The predetermined information of other applications can include, for example, one or more of contacts, call records, and calendars. For the convenience of description, in the present disclosure, the content that requires high privacy and needs to be protected in the terminal invoked by the application is referred to as privacy content.

In an embodiment, when the application invokes the content of the terminal, the content invoked by the application can be monitored, and when it is monitored that the content to be invoked by the application is predetermined privacy content, the application can be authorized permission to access the privacy content and other information different from the privacy content is returned.

In step S12, the application is authorized with permission to access the privacy content in response to monitoring that the application invokes the privacy content, and other information different from the privacy content is returned.

In an embodiment, in order to prevent the leakage of the privacy content and the hidden dangers to the security of the terminal information, the content of the terminal invoked by the application can be monitored, and when it is monitored that the content invoked by the application is the privacy content, the application can be authorized with the permission to access the privacy content and other information different from the privacy content is returned, wherein the returned other information different from the privacy content may be, for example, empty information or predetermined other information. For example, when it is monitored that the privacy content invoked by the application A is call records, the predetermined other information different from the call records is returned to the application A. As a result, the problem of giving the application A the information of the call records invoked by the application A and leaking the user's privacy content is avoided.

Furthermore, when it is monitored that the content invoked by the application is the privacy content, by authorizing the application with the permission to access the privacy content, the application can check that it has been authorized according to the permission given to the application to access the privacy content when the application checks whether it has the permission to invoke the privacy content, which ensures that the user can use the application normally, and avoids the case where the application cannot be used due to directly denying the application the permission to access the privacy content. By returning other information different from the privacy content to the application, the purpose of protecting the security of the privacy content in the terminal is realized, and the problem of giving the application the permission to access the privacy content and returning the privacy content to the application to leak important user information is avoided.

In some embodiments of the present disclosure, it is monitored whether an application invokes privacy content, and the application is authorized with the permission to access the privacy content, in response to monitoring that the application invokes the privacy content, and other information different from the privacy content is returned, thereby the user can realize the purpose of protecting the security of the user's privacy information under the premise of normal use of the application.

Figure 2:
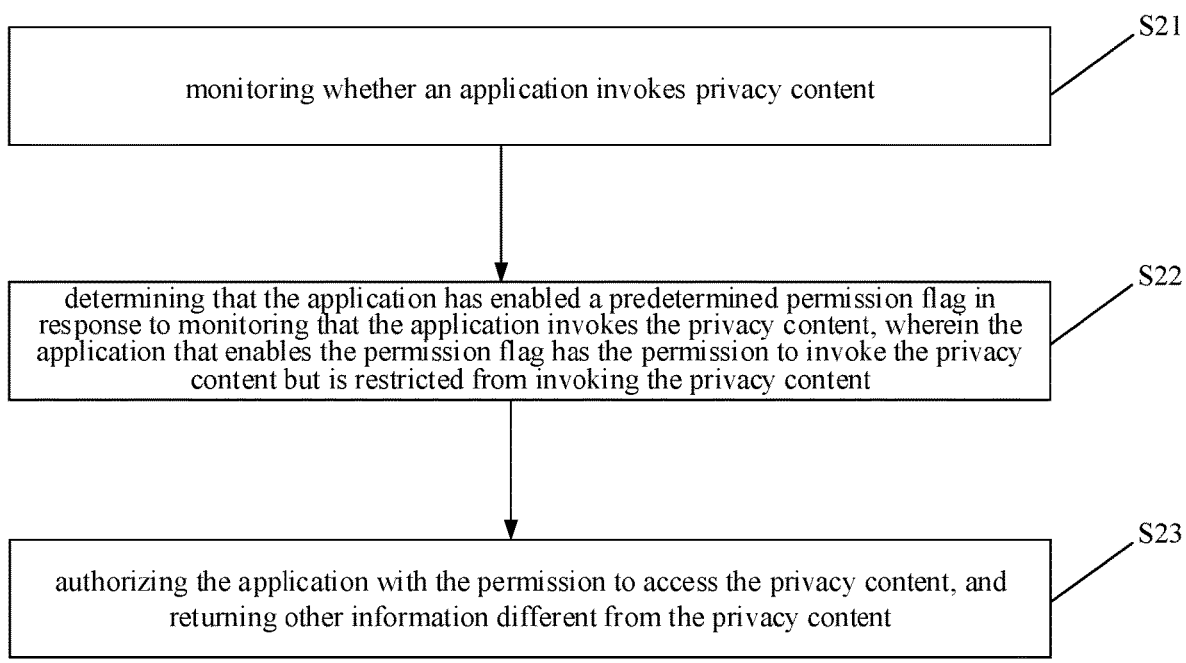
FIG. 2 is a flowchart illustrating an application accessing method according to some embodiments.

FIG. 2 is a flowchart illustrating an application accessing method according to some embodiments, and as shown in FIG. 2, the application accessing method is applied in a terminal, and includes the following steps.

In step S21, it is monitored whether an application invokes privacy content.

In the present disclosure, when the application invokes the content of the terminal, for example, the content invoked by the application can be monitored by the operating system of the terminal, and it has been monitored by the operating system of the terminal that the content invoked by the application is the privacy content.

In step S22, it is determined determining that the application has enabled a predetermined permission flag in response to monitoring that the application invokes the privacy content, wherein the application that enables the permission flag has the permission to invoke the privacy content but is restricted from invoking the privacy content.

At present, many applications, when being installed, must be given the required permission before they can be used, and after the application obtains the required permission, there is a risk of obtaining the user's privacy content in the terminal at any time. Therefore, in order to prevent the application from utilizing the obtained permission to leak the user's private information on the terminal, and causing hidden dangers to the security of the terminal information, after the user gives the application the required permission and the application is installed, the user can enable the predetermined permission flag for the application, such that the application of which the permission flag has been enabled can have the permission to invoke the privacy content but is restricted from invoking the privacy content, thereby avoiding the problem of the leakage of the user's private information on the terminal.

In an embodiment, for example, it is monitored by the system service of the terminal operating system whether the application invokes the privacy content, and when it is monitored that the application invokes the privacy content, the request that the application invokes the privacy content can be intercepted, and the request that the application invokes the privacy content is notified to the permission management service of the terminal operating system, and it is determined whether the application has enabled the predetermined permission flag through the permission management service, if the application has enabled the predetermined permission flag, the application is authorized by the permission management service with the permission to access the privacy content and other information different from the privacy content is returned to the system service, and the returned other information different from the privacy content is sent by the system service to the application.

Herein, the determining that the application has enabled a predetermined permission flag may be determined, for example, in the following manner:

determining that the application has enabled the predetermined permission flag, after enabling the permission flag of the application in response to receiving a user's instruction to turn on a switch for indicating whether the permission flag of the application is enabled or not in a terminal setting item. Herein, the instruction of the switch for indicating whether the permission flag of the application is enabled or not can include one or a combination of a gesture operation command, a biometric recognition operation command, and a key trigger command. Herein, the biometric identification operation instruction is an instruction formed after obtaining the biometric feature (for example, fingerprint, knuckle pattern or iris biometric feature).

In step S23, the application is authorized with the permission to access the privacy content, and other information different from the privacy content is returned.

In an embodiment, when the application invokes the privacy content, it is monitored that the application invokes the privacy content, and if it is obtained that the application enables the predetermined permission flag, the application is authorized the permission to access the privacy content and other information different from the privacy content is returned. As a result, when the application checks whether it has the permission to invoke the privacy content, the application can check that it has been authorized based on the permission given to the application to access the privacy content, which avoids the problem that the application cannot be used due to directly denying the application the permission to access the privacy content or that the important user information is leaked due to giving the application the permission to access the privacy content and returning the privacy content to the application.

For example, when the user installs the application A, because of the logic that the application A must be given the required permission in design to use the application A, in order to use the application A normally, after the user gives the application A the required permission and the installation of the application A is completed, in order to prevent the application A from utilizing the obtained permission to leak the predetermined information on the terminal (for example, terminal unique identification code information, contacts, call records and calendars), the user can turn on, in the terminal setting item, the switch indicating whether the permission flag of the application is enabled or not, and the permission flag of the application is enabled, so that the application after the permission flag thereof is enabled can have the permission to invoke the privacy content but is restricted from invoking the privacy content.

As such, for example, when the privacy content invoked by the application A is calendars, it is detected that the application A has enabled the predetermined permission flag, and the predetermined other information different from the privacy content, for example, empty information, is returned to application A. As a result, the problem of giving the application A the information of the calendars invoked by the application A and leaking the user's schedule information in the calendar is avoided.

In some embodiments of the present disclosure, the returning other information different from the privacy content to the application after monitoring that the application has enabled the predetermined permission flag in response to that the application on the terminal invokes the privacy content makes the user can realize the purpose of protecting the privacy content, i.e., protecting the security of the user's privacy information under the premise of normal use of the application.

The application accessing method involved in various embodiments the present disclosure will be described below by taking the ANDROID™ phone as an example of the terminal.

At present, since the official release of ANDROID™ 6.0 version, ANDROID™ 6.0 has introduced the dynamic permission management at the system level. That is, before the application in the ANDROID' phone invokes the privacy content in the terminal, the user is reminded in the form of a pop-up window, and the application can invoke the privacy content in the terminal after the user's secondary confirmation. However, the cases such as the abuse of application permission and the inability to use the application without the permission are still serious, but with the strengthening of user privacy protection awareness and the introduction of new privacy policies, there is an urgent need for more flexible and multi-faceted permission management services.

Figure 3:
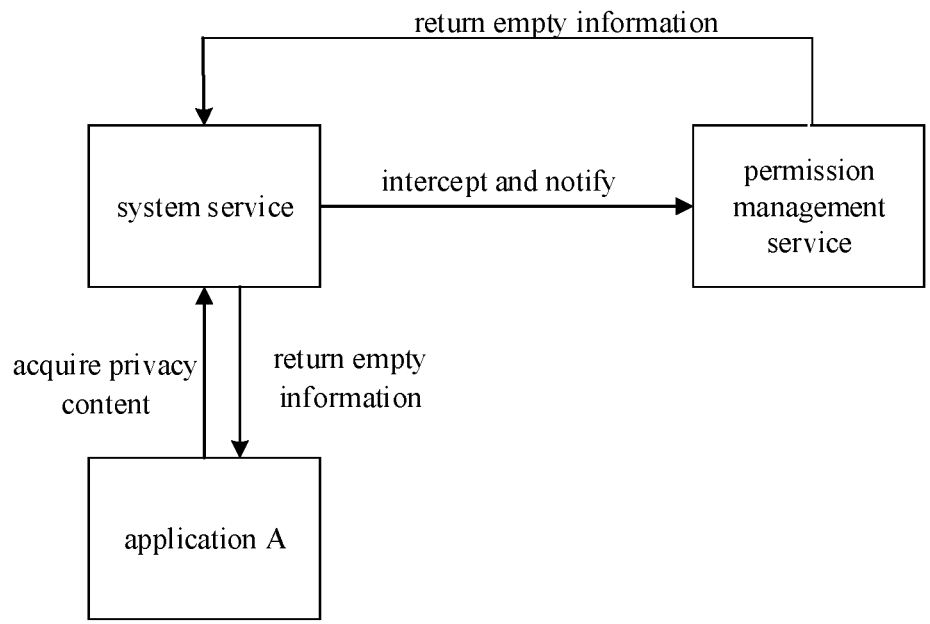
FIG. 3 is an example diagram illustrating an application accessing method according to some embodiments.

FIG. 3 is an example diagram illustrating an application accessing method applied to the ANDROID™ system according to some embodiments. In FIG. 3, in response to that the application A on the terminal invokes the privacy content, the privacy content being, for example, the terminal unique identification code information, the system service of the operating system intercepts the request that the application A invokes the terminal unique identification code information and notifies the permission management service of the ANDROID™ operating system to request the permission management service to determine whether the application A has enabled the predetermined permission flag, and after the permission management service detects that the application A has enabled the predetermined permission flag, the permission management service authorizes the application A the permission to access the privacy content, and returns the predetermined empty information to the system service, the system service returns the returned empty information to the application A.

Therefore, by authorizing the application A the access permission to invoke the privacy content, but actually returning other information different from the privacy content to the application A, the defect that the application A is not authorized with the permission and cannot obtain the invoked information such that the user cannot use the application A can be bypassed, thereby realizing the purpose of protecting user privacy and security.

Herein, in order to realize that before the application A invokes the privacy content, the application A has checked that it has the permission to invoke the privacy content to allow the user to use the application A, in the ANDROID™ system, for example, it can be implemented in the following manner:

String
   pkgName=ExtraActivityManagerService.getPackage
     NameByPid(pid);
PackageManagerInternal pmi=LocalServices.getService
   (PackageManagerInternal.class);
ApplicationInfo appinfo=pmi.getApplicationInfo(pkg-
   Name, 0,
     Process.SYSTEM_UID, UserHandle.getUserId(uid));
return appinfo !=null && ((appinfo.flags & Application-
   Info.FLAG_SYSTEM) !=0);

In the above way, when the application A checks whether it has the permission to invoke the privacy content from the permission management service (framework) through the application program interface (checkSelfPermission) or noteOperation (noteOp) for checking the invoking permission, the permission management service (framework) returns that it has been authorized for the invoking side of the application program interface for checking the invoking permission, i.e., the application A. When the system service checks whether the application A has the permission to invoke the privacy content from the permission management service (framework) through the application program interface (noteOp) for checking the invoking permission, the permission management service (framework) has detected that the application A has enabled the predetermined permission flag, and at this time, the permission management service (framework) authorizes the application A the permission to access the privacy content, and returns other information different from the privacy content to the system service, and the system service sends the returned other information different from the privacy content to the application A.

Therefore, by giving the application with the permission but not the privacy content, it is possible to bypass the unreasonable design that the application must be authorized with the permission and the privacy content is returned to the application such that the application can be used, thereby protecting the security of the user's privacy information.

Based on the similar concept, the embodiments of the present disclosure also provide an application accessing apparatus.

It can be understood that, in order to implement the above functions, the application accessing apparatus provided by the embodiments of the present disclosure includes a corresponding hardware structure and/or software module for executing each function. With reference to the units and algorithm steps of the examples disclosed in the embodiments of the present disclosure, the embodiments of the present disclosure can be implemented in the form of hardware or a combination of hardware and computer software. Whether a function is executed through the hardware or a manner that the computer software drives the hardware depends on the specific application and design constraints of the technical solutions. A person skilled in the art may use different methods to implement the described functions for each specific application, but such implementation should not be considered to exceed the scope of the technical solutions of the embodiments of the present disclosure.

Figure 4:
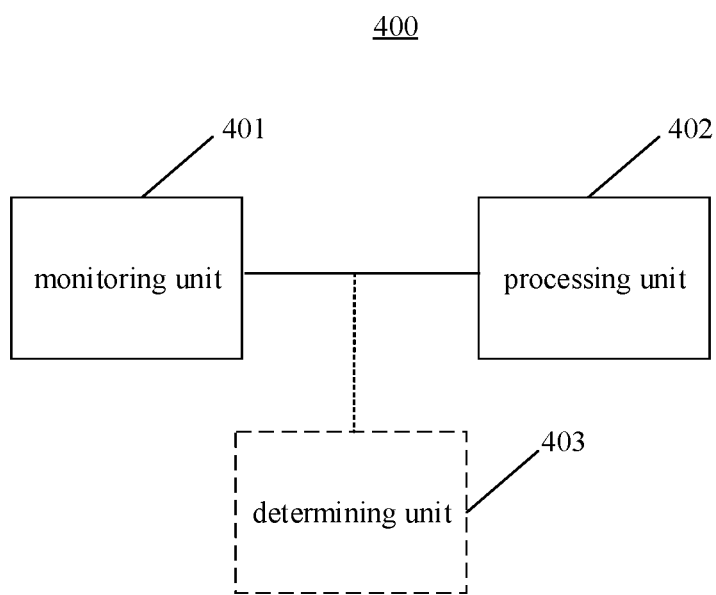
FIG. 4 is a block diagram illustrating an application accessing apparatus according to some embodiments.

FIG. 4 is a block diagram 400 illustrating an application accessing apparatus according to some embodiments. Referring to FIG. 4, the application accessing apparatus is applied to a terminal and includes a monitoring portion 401 and a processing portion 402.

Herein, the monitoring portion 401 is configured to monitor whether an application invokes privacy content; and the processing portion 402 is configured to authorize the application with the permission to access the privacy content in response to monitoring that the application invokes the privacy content, and return other information different from the privacy content.

In some embodiments, the other information is empty information.

In some embodiments, the application accessing apparatus further includes: a determining portion 404 configured to determine that the application has enabled a predetermined permission flag before authorizing the application with the permission to access the privacy content and returning other information different from the privacy content, wherein the application that enables the permission flag has the permission to invoke the privacy content but is restricted from invoking the privacy content.

In some embodiments, the determining portion 404 determines that the application has enabled the permission flag in the following manner: determining that the application has enabled the permission flag, in response to receiving a user's instruction to turn on a switch in a terminal setting item, the switch being used to indicate whether the permission flag of the application is enabled or not.

In some embodiments, the processing portion 402 authorizes the application with the permission to access the privacy content, in response to monitoring that the application invokes the privacy content, and returns other information different from the privacy content in the following manner: intercepting a request that the application invokes the privacy content in response to monitoring that the application invokes the privacy content, and determining that the application has enabled the permission flag by a permission management service; and authorizing the application with the permission to access the privacy content by the permission management service, and returning other information different from the privacy content.

With respect to the apparatus in the above embodiments, the implementations for performing operations by individual modules therein have been described in detail in the embodiments regarding the methods, which will not be elaborated herein.

Figure 5:
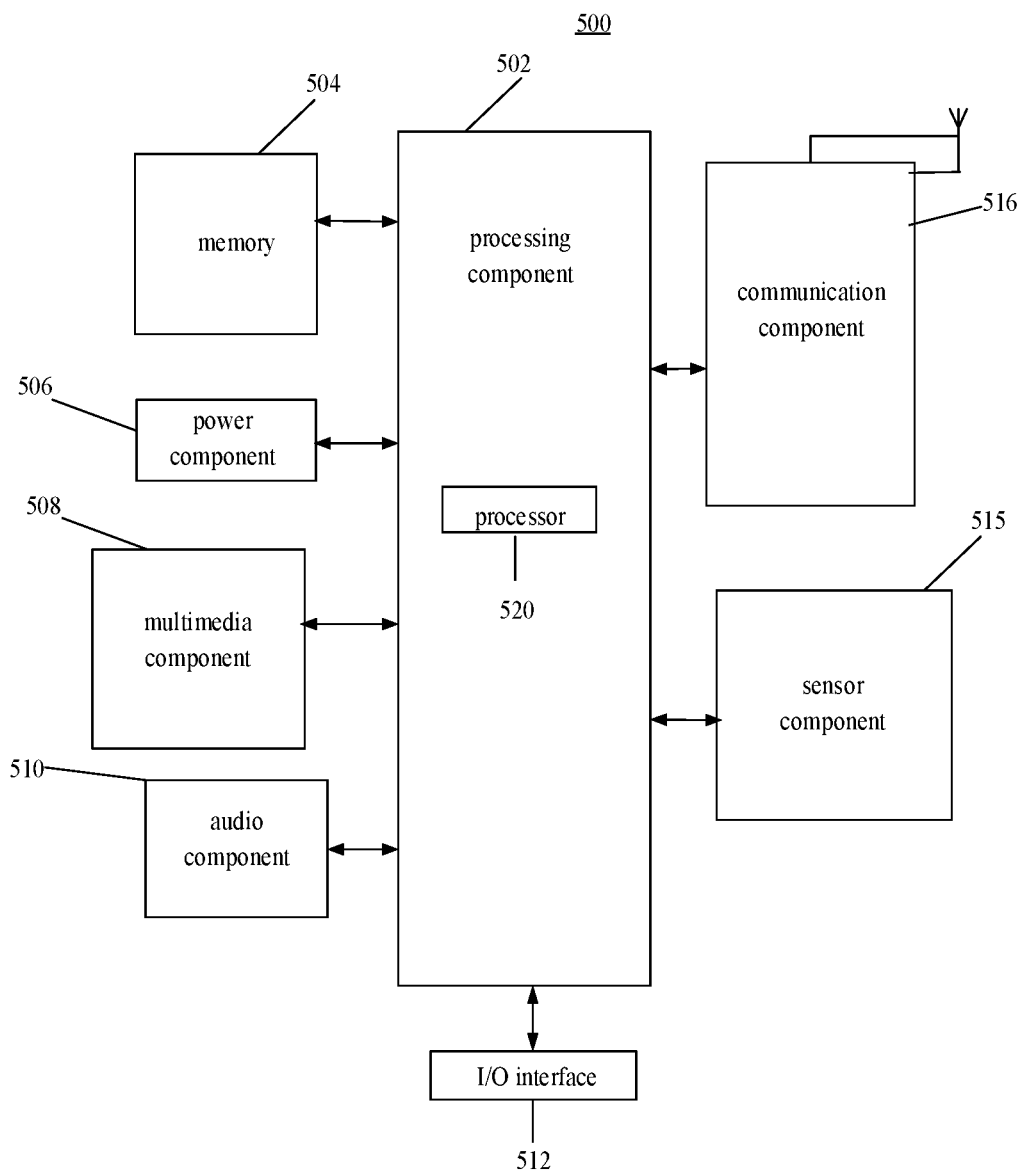
FIG. 5 is a block diagram illustrating a device according to some embodiments.

FIG. 5 is a block diagram illustrating a device 500 for application accessing according to some embodiments. For example, the device 500 can be a mobile phone, a computer, a digital broadcast terminal, a messaging device, a gaming console, a tablet, a medical device, exercise equipment, a personal digital assistant, and the like.

Referring to FIG. 5, the device 500 may include one or more of the following components: a processing component 502, memory 504, a power component 506, a multimedia component 508, an audio component 510, an input/output (I/O) interface 512, a sensor component 515, and a communication component 516.

The processing component 502 typically controls overall operations of the device 500, such as the operations associated with display, telephone calls, data communications, camera operations, and recording operations. The processing component 502 may include one or more processors 520 to execute instructions to implement all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 505 is configured to store various types of data to support the operation of the device 500. Examples of such data include instructions for any applications or methods operated on the device 500, contact data, phonebook data, messages, pictures, videos, etc. The memory 505 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 supplies power to various components of the device 500. The power component 506 may include a power management system, one or more power sources, and any other components associated with the generation, management, and distribution of power in the device 500.

The multimedia component 508 includes a screen providing an output interface between the device 500 and a user. In some embodiments, the screen may include a liquid crystal display (LCD) and a touch panel (TP). In some embodiments, organic light-emitting diode (OLED) displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 508 includes a front camera and/or a rear camera. The front camera and/or the rear camera can receive external multimedia data while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the device 500 is in an operation mode, such as a call mode, a recording mode, and a voice recognition mode. The received audio signal can be further stored in the memory 505 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 515 includes one or more sensors to provide status assessments of various aspects of the device 500. For instance, the sensor component 515 can detect an on/off status of the device 500, relative positioning of components, e.g., the display and a keypad, of the device 500, the sensor component 515 can also detect a change in position of the device 500 or one component of the device 500, a presence or absence of user contact with the device 500, an orientation or an acceleration/deceleration of the device 500, and a change in temperature of the device 500. The sensor component 515 may include a proximity sensor configured to detect the presence of nearby objects without any physical contact. The sensor component 515 may also include a light sensor, such as a CMOS or CCD image sensor, for use in imaging applications. In some embodiments, the sensor component 515 can also include an accelerometer sensor, a gyroscope sensor, a magnetic sensor, a pressure sensor, or a temperature sensor.

The communication component 516 is configured to facilitate wired or wireless communication between the device 500 and other devices. The device 500 can access a wireless network based on a communication standard, such as Wi-Fi, 2G, 3G, 4G, or 5G, or a combination thereof. In some embodiments, the communication component 516 receives a broadcast signal or broadcast associated information from an external broadcast management system via a broadcast channel. In some embodiments, the communication component 516 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as the memory 505 including the instructions executable by the processor 520 in the device 500, for performing the above-described methods. For example, the non-transitory computer-readable storage medium can be a ROM, a random-access memory (RAM), a CD-ROM, a magnetic tape, a floppy disc, an optical data storage device, and the like.

The various device components, modules, units, blocks, parts, or portions may have modular configurations, or are composed of discrete components, but nonetheless can be referred to as "modules" or "units" in general. In other words, the "components," modules," "blocks," "parts," "portions," or "units" referred to herein may or may not be in modular forms, and these phrases may be interchangeably used.

Various embodiments of the present disclosure can have the following advantages: it is monitored whether an application invokes privacy content, and the application is authorized with the permission to access the privacy content, in response to monitoring that the application invokes the privacy content, and other information different from the privacy content is returned, thereby the user can realize the purpose of protecting the security of the user's privacy information under the premise of normal use of the application.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

What is claimed is:

1. An application accessing method, applied to a terminal, comprising:
    monitoring whether an application installed in the terminal invokes request for privacy content;
    intercepting the request by an operating system of a system service; and
    authorizing the application with permission to access the privacy content, in response to monitoring that the application invokes the privacy content, and returning other information different from the privacy content,
    wherein the application checks whether it has the permission to invoke the privacy content, and the application detects that it has been authorized after the operating system requests a permission management service to determine whether the application has enabled a predetermined permission flag according to the permission to access the privacy content to enable users to use the application without additional user confirmation.

2. The application accessing method according to claim 1, wherein the other information is empty information.

3. The application accessing method according to claim 1, wherein prior to the authorizing the application with permission to access the privacy content and returning other information different from the privacy content, the method further comprises:
    determining that the application has enabled a predetermined permission flag, wherein the application that enables the permission flag has the permission to invoke the privacy content but is restricted from invoking the privacy content.

4. The application accessing method according to claim 3, wherein the determining that the application has enabled the permission flag comprises:
    determining that the application has enabled the permission flag, in response to receiving a user's instruction to turn on a switch in a terminal setting item, the switch being used to indicate whether the permission flag of the application is enabled or not.

5. The application accessing method according to claim 3, wherein the authorizing the application with permission to access the privacy content, in response to monitoring that the application invokes the privacy content, and returning other information different from the privacy content comprises:
    intercepting a request that the application invokes the privacy content, in response to monitoring that the application invokes the privacy content, and determining that the application has enabled the permission flag through a permission management service; and
    authorizing the application with the permission to access the privacy content by the permission management service, and returning other information different from the privacy content.

6. A mobile terminal implementing the method according to claim 1, wherein the mobile terminal is configured to:
    protect security of user's privacy information under normal use of a plurality of applications by authorizing the plurality of applications with permission to access the privacy content, in response to monitoring that the applications invoke the privacy content, and returning other information different from the privacy content.

7. The mobile terminal according to claim 6, further comprising a display screen configured to display the other information.

8. An application accessing device, comprising:
    a processor device; and
    memory for storing instructions executable by the processor, wherein, the processor device is configured to execute:
    monitoring whether an application installed in a terminal invokes a request for privacy content;
    intercepting the request by an operating system of a system service; and
    authorizing the application with permission to access the privacy content, in response to monitoring that the application invokes the privacy content, and returning other information different from the privacy content,
    wherein the application checks whether it has the permission to invoke the privacy content, and the application detects that it has been authorized after the operating system requests a permission management service to determine whether the application has enabled a predetermined permission flag according to the permission to access the privacy content to enable users to use the application without additional user confirmation.

9. The application accessing device according to claim 8, wherein prior to authorizing the application with permission to access the privacy content and returning other information different from the privacy content, the processor is further configured to perform:
    determining that the application has enabled a predetermined permission flag, wherein the application that enables the permission flag has the permission to invoke the privacy content but is restricted from invoking the privacy content.

10. The application accessing device according to claim 9, wherein the determining that the application has enabled the permission flag comprises:
　　determining that the application has enabled the permission flag, in response to receiving a user's instruction to turn on a switch in a terminal setting item, the switch being used to indicate whether the permission flag of the application is enabled or not.

11. The application accessing device according to claim 10, wherein the authorizing the application with permission to access the privacy content, in response to monitoring that the application invokes the privacy content, and returning other information different from the privacy content comprises:
　　intercepting a request that the application invokes the privacy content, in response to monitoring that the application invokes the privacy content, and determining that the application has enabled the permission flag through a permission management service; and
　　authorizing the application with the permission to access the privacy content by the permission management service, and returning other information different from the privacy content.

12. A non-transitory computer-readable storage medium having stored thereon instructions that, when executed by a processor of a mobile terminal, causes the mobile terminal to execute:
　　monitoring whether an application installed in the terminal invokes a request for privacy content;
　　intercepting the request by an operating system of a system service; and
　　authorizing the application with permission to access the privacy content, in response to monitoring that the application invokes the privacy content, and returning other information different from the privacy content,
　　wherein the application checks whether it has the permission to invoke the privacy content, and the application detects that it has been authorized after the operating system requests a permission management service to determine whether the application has enabled a predetermined permission flag according to the permission to access the privacy content to enable users to use the application without additional user confirmation.

13. The non-transitory computer-readable storage medium according to claim 12, wherein prior to the authorizing the application with permission to access the privacy content and returning other information different from the privacy content, the method further comprises:
　　determining that the application has enabled a predetermined permission flag, wherein the application that enables the permission flag has the permission to invoke the privacy content but is restricted from invoking the privacy content.

14. The non-transitory computer-readable storage medium according to claim 13, wherein the determining that the application has enabled the permission flag comprises:
　　determining that the application has enabled the permission flag, in response to receiving a user's instruction to turn on a switch in a terminal setting item, the switch being used to indicate whether the permission flag of the application is enabled or not.

15. The non-transitory computer-readable storage medium according to claim 13, wherein the authorizing the application with permission to access the privacy content, in response to monitoring that the application invokes the privacy content, and returning other information different from the privacy content comprises:
　　intercepting a request that the application invokes the privacy content, in response to monitoring that the application invokes the privacy content, and determining that the application has enabled the permission flag through a permission management service; and
　　authorizing the application with the permission to access the privacy content by the permission management service, and returning other information different from the privacy content.

\* \* \* \* \*